US006917916B2

(12) United States Patent
Curtis et al.

(10) Patent No.: US 6,917,916 B2
(45) Date of Patent: Jul. 12, 2005

(54) METHOD AND APPARATUS FOR TESTING DIGITAL CHANNELS IN A WIRELESS COMMUNICATION SYSTEM

(75) Inventors: Chris B. Curtis, Scottsdale, AZ (US); Joseph T. Marino, Jr., Prescott, AZ (US); Bruce A. Fette, Mesa, AZ (US)

(73) Assignee: Motorola, Inc., Schaumburg, IL (US)

( * ) Notice: Subject to any disclaimer, the term of this patent is extended or adjusted under 35 U.S.C. 154(b) by 725 days.

(21) Appl. No.: 10/022,463

(22) Filed: Dec. 13, 2001

(65) Prior Publication Data

US 2003/0115515 A1 Jun. 19, 2003

(51) Int. Cl.[7] .............................................. G10L 19/14
(52) U.S. Cl. ..................................................... 704/228
(58) Field of Search ................................ 704/226–228, 704/233; 370/252, 349, 395.21, 335, 352; 455/452.2

(56) References Cited

U.S. PATENT DOCUMENTS

| | | | | |
|---|---|---|---|---|
| 6,049,543 A | * | 4/2000 | Sauer et al. ................ | 370/335 |
| H2051 H | * | 11/2002 | Zhu et al. ............... | 370/395.21 |
| 6,529,730 B1 | * | 3/2003 | Komaili et al. ........... | 455/452.2 |
| 2002/0048268 A1 | * | 4/2002 | Menon et al. .............. | 370/349 |
| 2002/0061012 A1 | * | 5/2002 | Thi et al. .................... | 370/352 |
| 2002/0176404 A1 | * | 11/2002 | Girard ........................ | 370/352 |
| 2003/0002446 A1 | * | 1/2003 | Komaili et al. ............. | 370/252 |

FOREIGN PATENT DOCUMENTS

WO    WO 9912228      8/1999

\* cited by examiner

*Primary Examiner*—David D. Knepper
(74) *Attorney, Agent, or Firm*—Marshall, Gerstein & Borun LLP

(57) ABSTRACT

In a digital channel of a digital wireless communication system including at least one mobile station, at least one base transceiver station in communication with the mobile station, a transcoder configured to provide a signal conversion between vocoder frames and pulse code modulation, and a mobile switching center for interconnecting the digital wireless communication system to a public switched telephone network, a method and apparatus for determining a fault in the digital channel is disclosed. The method includes generating a first set of vocoder input parameters from a speech input signal, and generating a second set of vocoder input parameters from an output signal substantially equivalent to the speech input signal as it is received at a mobile station via the digital channel. The method further includes calculating a metric based on the first and the second set of vocoder input parameters, and subsequently determining a fault in the digital channel using the metric.

17 Claims, 7 Drawing Sheets

METHOD AND APPARATUS FOR TESTING DIGITAL CHANNELS IN A WIRELESS COMMUNICATION SYSTEM

FIELD OF THE INVENTION

The present invention relates to wireless communication systems, and more particularly, to a method and an apparatus for audio testing digital channels in a wireless communication system.

BACKGROUND OF THE INVENTION

Wireless communication systems that utilize digitally coded communication signals are known in the art. One such system is a direct sequence Code Division Multiple Access (DS-CDMA) cellular communication system, such as set forth in the Telecommunications Industry Association Interim Standard 2000 (TIA IS-2000) herein after referred to as IS-2000. In accordance with IS-2000, the coded communication signals used in the DS-CDMA system include signals that are transmitted in a common channel, typically a 1.25 MHz bandwidth common channel, between mobile stations (MS) and base transceiver stations (BTS) located at the base sites (BS) of a wireless communication system.

A digital wireless communication system is a complex network of elements and their interconnections and protocols. Typically elements include (1) a radio link to the mobile stations (e.g., cellular telephones), which is usually provide by at least one and typically several base stations, (2) communication links between the base stations, (3) a controller, typically one or more base station controllers or centralized base station controllers (BSC/CBSC), to control communication between and to manage the operation and interaction of the base stations, (4) a call controller or switch, typically a call agent (i.e., a "softswitch"), for routing calls within the system, and (5) a link to the land line or public switch telephone network (PSTN), which is usually also provided by the call agent.

Optimization of performance efficiency of a wireless communication system is generally accomplished through fault detection testing. Of particular importance in a wireless communication system is the quality of a digital voice channel path. The typical digital voice channel path may include the over-the-air interface between a source mobile station and a destination mobile station as well as all of the infrastructure used to connect the source mobile station to the destination mobile station, for example the BTS, the transcoder in the CBSC, and the MSC. Various types of fault detection testing have been used in an attempt to detect problems in the digital voice channel path. The most well known testing method, commonly referred to as the analog system audio test, or SALT, was developed originally for use in analog communication systems. The SALT test utilizes special test equipment to inject a single-frequency audio tone into a previously established voice call. The single-frequency audio tone is looped back to the sending equipment where its frequency and audio level are measured. The test is considered to be successful (indicating a working channel) if the frequency and audio level are reasonable close to the frequency and audio level of the injected tone. SALT however, has a number of problems when applied to a digital based wireless communication system. First, a single-frequency audio tone is not reproduced well by the digital infrastructure of a wireless communication system. As expected, vocoders in the call channel distort a single-frequency audio tone in completely unpredictable ways. In addition, the echo-cancelling and noise suppression devices in the call channel treat the single-frequency audio tone as noise or echo, and consequently attempts to filter or suppress it. Various combinations of tones have been tried in an attempt to overcome the aforementioned problems, however none have been found to produce better than about 95% accuracy with respect to a comparison of the injected tone(s) with the frequency and audio level of the looped back tone. Second, there is a settling time associated with the use of single frequency audio tones such that approximately one minute is required to test each voice channel and there are generally hundreds of voice channels associated with each base station. In order to save time, additional test devices in the form of costly specially designed test equipment are needed. However, there is a physical limit to the number of test devices that can be connected to the cellular system at one time.

A second test method, referred to as a Markov test is also used for fault detection on voice channels. It requires a special test mobile station to initiate a "markov call" which requires normal vocoding to be disabled and the normal call processing model to be significantly modified. As a result the Markov test only verifies a portion of the voice channel; the air interface between the network vocoders and the special test mobile station.

A third test method referred to as Perceptual Speech Quality Measurement test, defined in the ITU P.861 "Series P: Telephone Transmission Quality" specification, has been suggested as a alternative to SALT. The purpose of PSQM test is to measure the perceived quality of POTS telephony vocoders in an automated fashion, rather than having to rely on a statistical analysis of responses of human test subjects as is done to Mean Opinion Scores (MOS). In general, the PSQM test works by modeling the way which humans perceive the quality of speech. Test samples are injected into the PSQM model which generates a set of parameters from the test samples. The parameters are then forwarded to a mapping function where they are evaluated and assigned a Mean Opinion Score (MOS). The PSQM test however is not intended for use in a wireless communication environment. Further, even if it were applicable to wireless communication environments, it would require complex and expensive hardware modifications to test equipment currently used for fault detection on voice channels.

A fourth method used for fault detection on a voice channel utilizes a recorded reference speech sample (original recorded speech sample) which is injected into the call path of a first special test mobile station and received by a second special test mobile which records the resulting speech. In the Speech Waveform Matching test, the recorded resulting speech is compared to the original reference speech sample and the degree to which they match is measured. However, the process of vocoding does not necessarily reconstruct a replica that looks like the original recorded speech sample. Instead, vocoding reconstructs a replica that sounds like, to a human listener, the original recorded speech sample. Thus, the degree to which the original reference speech sample and the recorded resulting speech sample, matched, would always be skewed by the very presence of the vocoders in the voice channel path. In addition, the accuracy of the Speech Waveform Matching test is a function of the time it takes to perform the test. A longer recorded resulting speech sample yields a better correlation result than a shorter recorded resulting speech sample. However, the longer recorded resulting speech samples require more time to collect. Further, the special test mobile stations lack sufficient memory capacity to accommodate both the original reference speech sample and the longer recorded resulting speech.

DETAILED DESCRIPTION OF THE PREFERRED EMBODIMENTS

Figure 1:
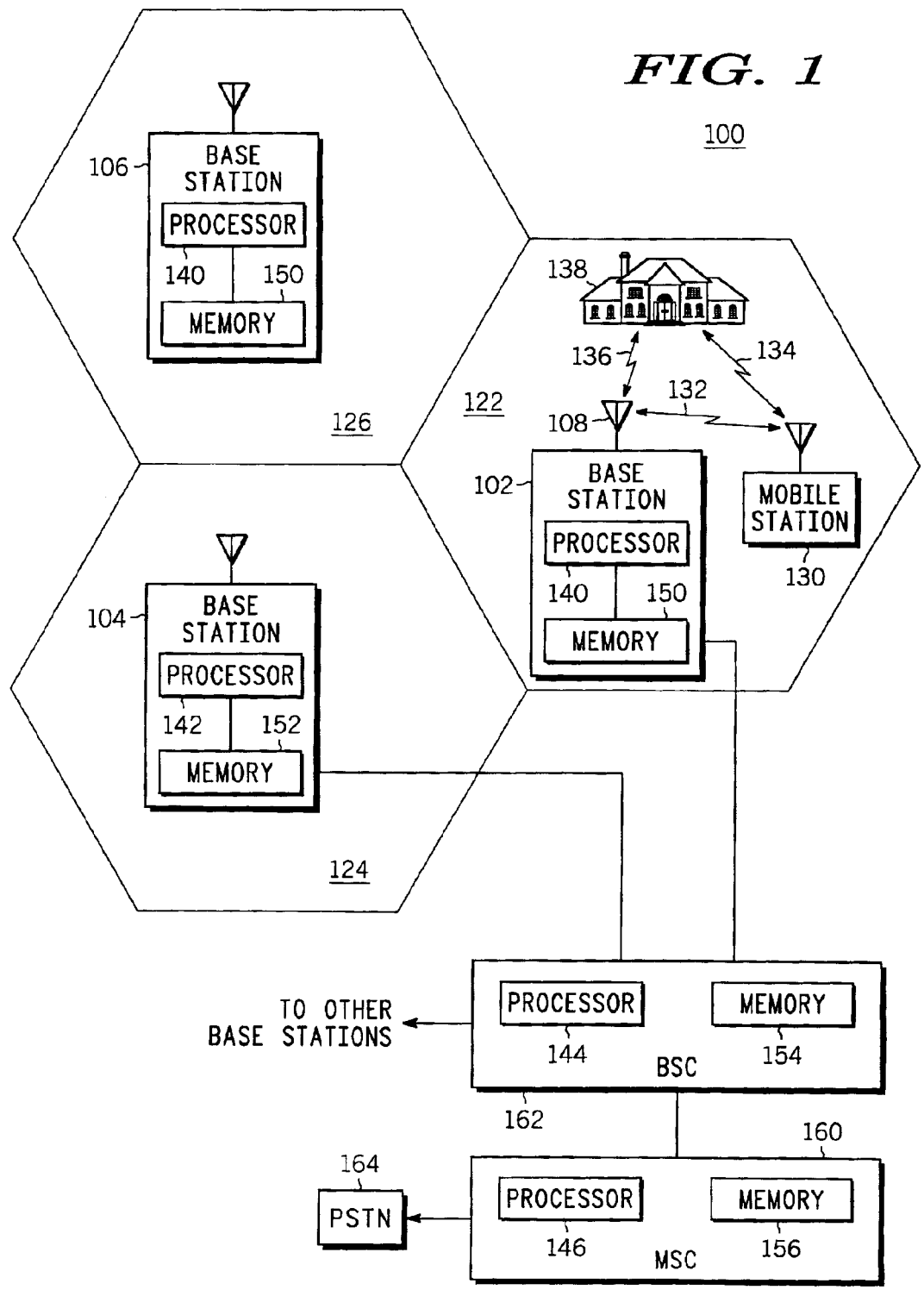
FIG. 1 depicts a DS-CDMA wireless communication system.

While the present invention is susceptible of embodiment in many different forms, there are shown in the drawings and will be described herein in detail specific embodiments thereof, with the understanding that the present disclosure is to be considered as an exemplification of the principles of the invention and is not intended to limit the invention to the specific embodiments illustrated.

As mentioned described above, a need remains for a method and apparatus to perform fault detection testing of a digital voice channel path in a digital wireless communication system environment.

In accordance with an embodiment of the invention, a method and apparatus for determining a fault in a digital channel, operates in a digital wireless communication system. The digital wireless communication system may include a multiplicity of mobile stations, a multiplicity of base transceiver stations, each of the multiplicity of base transceiver stations in communication with at least one of the mobile stations, a transcoder configured to provide a signal conversion capability between vocoder frames and pulse code modulation, and a mobile switching center for interconnecting the digital wireless communication system to a public switched telephone network. A source test mobile station generates a first set of vocoder input parameters. The first set of vocoder input parameters results from a speech input signal which has been vocoder encoded. A transcoder generates a second set of vocoder input parameters. The second set of vocoder input parameters results from an output signal substantially equivalent to the speech input signal as it is received at a destination mobile station via the digital channel. A metric is calculated based on the first set of vocoder input parameters and the second set of vocoder input parameters, and a fault is determined in the digital channel using the metric.

Turning now to the drawings, wherein like numerals designate like components, FIG. 1 depicts a CDMA wireless communication system 100. The CDMA wireless communication system 100 preferably comprises a direct spread code division multiple access (DS-CDMA) cellular communication system, although a multi-carrier CDMA cellular communication system may be suitable.

The CDMA wireless communication system 100 includes base stations 102, 104, 106 providing service to coverage areas 122, 124, and 126 respectively, and one or more mobile stations although only one mobile station 130 is shown. The base stations 102 and 106 include, among other things, a processor 140 and a memory 150. Similarly, base station 104 includes, among other things, a processor 142 and a memory 152. Base transceiver station 102 includes a transceiver (not shown) that transmits coded communication signals to, and receives coded communication signals from, the mobile station 130 via an antenna 108. A receiver, preferably a RAKE receiver within the transceiver provides tracking and demodulation capability of incoming multipath coded signals from mobile stations. Similarly, the mobile station 130 includes a transceiver that transmits coded signals to, and receives coded signals from, the base station 102 within a coverage area 122. In addition to a transceiver, the mobile station 130 includes an encoder speech codec which converts coded voice signals to electronic signals, typically via a code excited linear prediction (CELP) vocoder model, in order to compress the coded voice signal prior to transmission. The received electronic signals are then used by a decoding vocoder to reconstruct the coded voice signals at the receiving end.

The base stations 102, 104, and 106 are coupled to a base station controller (BSC) 162, which includes, among other things, a processor 144 and a memory 154, and which is in turn coupled to a mobile switching center (MSC) 160, also including a processor 146 and a memory 156. The MSC 160 is coupled to a public switched telephone network (PSTN) 164 using known techniques.

A mobile communication signal 132 is conveyed between the mobile station 130 and the base station 102 through a radio frequency (RF) channel. The RF channel includes a reverse-link (mobile station 130 to base station 102 ) and a forward-link (base station 102 to mobile station 130 ). Multipath replicas 136 and 134, or copies of mobile communication signal 132 resulting from of signal reflections off of nearby scatterers such as building 138, may also be conveyed between mobile station 130 and the base station 102.

Signal transmission systems require a certain minimum frequency response in order to transmit a given signal. In order to achieve such a frequency response, the bandwidth of the signal transmission system must be at least twice the bandwidth of the signal being transmitted; a luxury not available in a wireless communication system. As a result of the bandwidth requirement in traditional signal transmission, a variety of audio coding methods were developed for use in wireless communication systems such as the CDMA wireless communication system 100. The central objective in audio coding, or compression, is to represent a signal with a minimum number of bits while generating an output audio signal that cannot be distinguished from the original input audio signal. This signal representation may be accomplished through the use of speech synthesis algorithms, for example a CELP vocoder algorithm. DS-CDMA utilizes numerous CELP vocoder algorithms to perform audio coding of variable rate speech.

CELP vocoder algorithms used in wireless communication mobile stations operate by establishing an electronic model of the human vocal system. Using the CELP algorithm, human speech is converted to electronic signals by a process referred to as encoding. Transmission of the electronic signals require significantly less bandwidth than transmission of human voice. At the receiving end, the electronic signals are decoded and used to reconstruct the human speech. Thus, although the speech at the receiving end sounds like transmitted human voice, it is merely a reconstruction of human voice, utilizing the received electronic signals.

An example of a CELP vocoder used for speech decoding in CDMA wireless communication system 100 is set forth in the Telecommunications Industry Association Interim Standard 96-B (TIA IS 96-B) herein after referred to as IS-96B. In general, the CELP vocoder uses a codebook and a pseaudoramdom noise generator to vector-quantize the original voice signal using an analysis-by-synthesis method. To accomplish speech encoding, the CELP encoder samples the input speech, converts it to a digital format, and determines a set of input parameters $\hat{I}, \hat{G}, \hat{L}, \hat{b}, \hat{a}1 \ldots \hat{a}10$, to be used in the CELP decoding procedure. The set of input parameters is selected to minimize the perceptual difference between the original speech being input to, and the synthesized speech being output from the CELP vocoder. These input parameters, determined from the speed of the voice speech, its pitch, its gain, etc., attempt to model the creation of voice by the vocal tract. Once determined, the input parameters are quantized and packed into data packets for transmission. To accomplish speech decoding, or reconstruction of the original speech at the other end, the data packets are unpacked, the received input parameters are unquantized, and the speech input signal is reconstructed as a synthesized speech output signal. Line spectrum pair (LSP) frequencies derived from linear predictive coding coefficients $\hat{a}1 \ldots \hat{a}10$ previously determined by the encoding procedure, are used to reproduce the speech signal. Accordingly, during the decoding process, the LSP frequencies are mathematically converted back to formant synthesis parameters $\hat{a}1 \ldots \hat{a}10$. Thus, based on the received input parameters, a receiver in conjunction with a vocoder decoder, attempts to model the original input speech using the information contained in the input parameters to produce the synthesized speech output.

As previously described, various fault detection techniques have been utilized in an attempt to optimize digital voice channel path quality. The current techniques, however, require lengthy test times, require complex and expensive hardware modifications, do not take advantage of existing communication system properties, and are generally not well suited for application to digital voice channels.

Figure 2:
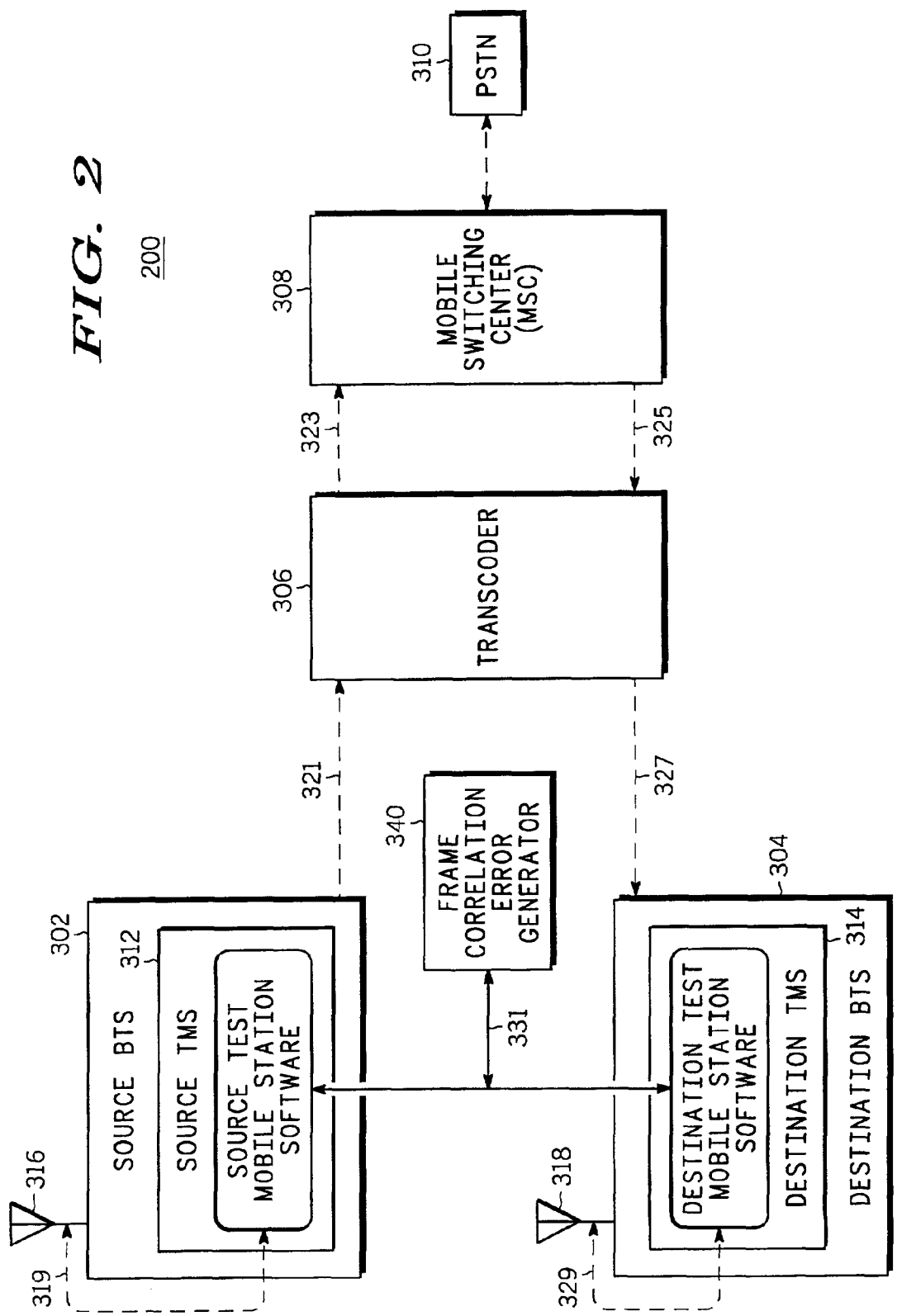
FIG. 2 is high-level block diagram of an embodiment of a digital channel test configuration.

A high-level block diagram of an exemplary digital channel test configuration 200 capable of employing the teachings of the present invention is illustrated in FIG. 2. Digital channel test configuration 200 utilizes the line spectrum pair (LSP) frequencies derived from the formant synthesis parameters $\hat{a}1 \ldots \hat{a}10$, to perform fault detection of a digital voice channel path, according to an embodiment of the present invention. A series of frame correlation error metrics are calculated from (1) the LSP frequencies generated by the encoding of a speech input signal, and (2) the LSP frequencies generated from the output signal, the output signal formed by decoding and re-encoding the speech input signal as it passed through a digital voice channel path. The series of frame correlation error metrics are used to determine whether a the digital voice channel path is acceptable.

Digital channel test configuration 200, includes a source BTS 302, a destination BTS 304, a transcoder 306, a MSC 308, a PSTN 310, and a frame correlation error generator 340. Source BTS 302 further includes a source antenna 316 and a source test mobile station (TMS) 312 having source TMS software including vocoder encoder and decoder capability, while destination BTS 304 further includes a destination antenna 318 and a destination TMS 314 having destination TMS software including vocoder encoding and decoding capability. Although a source TMS and destination TMS are depicted, any type of radio frequency diagnostic subsystem with mobile station capability may be used in digital channel test configuration 200.

A speech input signal 319, transmitted over-the-air from source TMS 312 is received by source antenna 316. Speech input signal 319 is formed by vocoder encoding a speech signal received by a mobile station and is preferably composed of a generated, vocoder encoded data frame sample that can be decoded and then re-encoded while keeping the amount of distortion of the signal to a minimum. For example, the vocoder encoded data frame sample may be generated from a vowel sound (i.e. /eh/) with a pitch period that is an integer per frame (80 sample pitch for a 160 sample frame). The vocoder data frame sample may also be composed of forty frames; ten frames of the vowel sound followed by 10 frames of "silence" where the vocoder shifts to ⅛ frames speed, followed by 10 frames of the vowel sound, and followed by 10 more frames of silence.

A set of LSP frequencies, a first set, calculated from input parameters $\hat{a}1 \ldots \hat{a}10$, resulting from vocoder encoding the speech signal, is forwarded to frame correlation error generator 340. The set of LSP frequencies generated from 40 frames of encoded speech, includes many groups of LSP frequencies. Each group of LSP frequencies contains 10 LSP frequencies.

Next, speech input signal 319 is demodulated and receiver decoded by a receiver (not shown) at source BTS 302. A resulting signal 321, still vocoder encoded, is transmitted to transcoder 306 via a T1 span. Transcoder 306 uses the original set of input parameters $\hat{I}, \hat{G}, \hat{L}, \hat{b}, \hat{a}1 \ldots \hat{a}10$, including the 10 LSP frequencies per frame, to convert resulting signal 321 to a pulse code modulation (PCM) signal 323 suitable for receipt and transmission by MSC 308. Thus, transcoder 306 vocoder decodes speech input signal 319. MSC 308, after having switched PCM signal 323 to an appropriate link, outputs a PCM signal 325 to transcoder 306. Transcoder 306 converts PCM signal 325 to a vocoder frame signal 327 suitable for receipt by destination BTS 304. Transcoder 306 generates a second set of input parameters $\hat{I}, \hat{G}, \hat{L}, \hat{b}, \hat{a}1 \ldots \hat{a}10$, including 10 LSP frequencies per frame, which are theoretically identical to the original set of input parameters. Upon receipt, a receiver at BTS 304 modulates and receiver encodes vocoder frame signal 327 to produce an output signal 329, which is transmitted over-the-air via antenna 318 to destination TMS 314. Output signal 329 results from decoding and re-encoding speech input signal 319 as it travels from antenna 316 to destination TMS 314 through digital channel test configuration 300. Upon receipt of output signal 329 by destination TMS 314, a set of LSP frequencies, a second set, calculated from input parameters $\hat{a}1 \ldots \hat{a}10$, describing output signal 329, is forwarded to frame correlation error generator 340. Again, the set of LSP frequencies generated from 40 frames of encoded speech, includes many groups of LSP frequencies. Each group of LSP frequencies contains 10 LSP frequencies. The first set of LSP frequencies from input speech signal 319, and the second set of LSP frequencies from output signal 329, are mathematically compared using methods discussed in connection with FIG. 3 to determine if the digital voice channel path is acceptable.

Figures 3, 4:
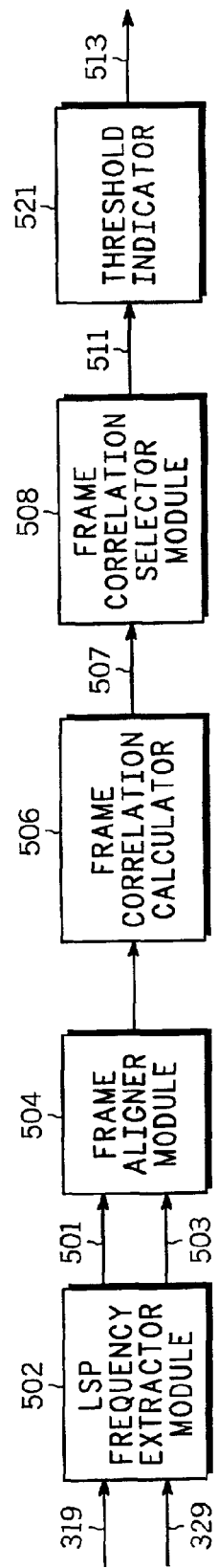
FIG. 3 is a more detailed block diagram showing one embodiment of a frame correlation error generator illustrated in FIG. 2.
FIG. 4 is a pictorial representation of a first set of line spectrum pair frequencies described in connection with FIG. 3.

A more detailed block diagram of an embodiment of frame correlation error generator 340 is illustrated in FIG. 3.

In this embodiment, frame correlation error generator 340 includes a plurality of modules 502, 504, 506, 508, and 521. Each of these modules may be implemented by a microprocessor executing software instructions and/or conventional electronic circuitry. In addition, a person of ordinary skill in the art will readily appreciate that certain modules may be combined or divided according to customary design constraints.

For purposes of determining whether a digital voice channel path is acceptable, a series of frame correlation error metrics are calculated and compared by frame correlation error generator 340. As previously discussed in connection with FIG. 2, a frame correlation error metric is calculated using the one group's worth of 10 LSP frequencies resulting from speech input signal 319, and one group's worth of 10 LSP frequencies resulting from output signal 329. An LSP frequency extractor module 502 extracts a first set of LSP frequencies 501 from speech input signal 319, the first set of LSP frequencies composed of groups of LSP frequencies, each group composed of 10 LSP frequencies. FIG. 4 is a pictorial representation of the first set of LSP frequencies described in connection with FIG. 3. As shown in FIG. 4, the first set of LSP frequencies 501 is represented as a series of groups of ten LSP frequencies, each group of ten LSP frequencies derived from a corresponding encoded vocoder frame. Thus, the first group 530 of the first set of LSP frequencies 501 includes 10 LSP frequencies corresponding with frame one of the speech input signal, the second group 532 of the first set of LSP frequencies 501 includes 10 LSP frequencies corresponding to frame two of the speech input signal, the third group of ten LSP frequencies includes 10 LSP frequencies corresponding to frame three of the speech input speech signal, and the $m^{th}$ group 534 of the first set of ten LSP frequencies 501 includes 10 LSP frequencies corresponding to frame m of the speech input speech signal. Although the first set of LSP frequencies, as described, is calculated by formant synthesis filter 210 from linear predictive coding coefficients $\hat{a}1 \ldots \hat{a}10$, derived from the actual input speech signal received by source TMS 312, the first set of LSP frequencies may also be calculated from linear predictive coding coefficients $\hat{a}1 \ldots \hat{a}10$, selected to model an input speech signal.

Figure 5:
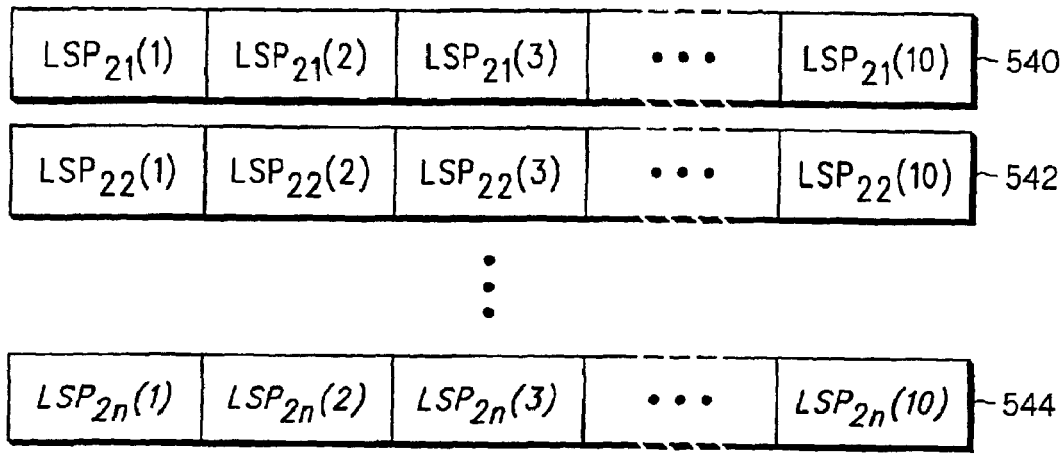
FIG. 5 is a pictorial representation of a second set of line spectrum pair frequencies described in connection with FIG. 3.

LSP frequency extractor module 502 also extracts a second set of LSP frequencies 503 from output signal 329. The second set of LSP frequencies is extracted from output signal 329 prior to decoding output signal 329 by destination TMS 314. FIG. 5 is a pictorial representation of second set of LSP frequencies 503 described in connection with FIG. 3. Second set of LSP frequencies 503 is represented as a series of groups of ten LSP frequencies, each group of ten LSP frequencies derived from a corresponding vocoder frame. Thus the first group 540 of the second set of LSP frequencies 503 includes 10 LSP frequencies corresponding with frame one of the output signal, the second group 542 of the second set of LSP frequencies 503 includes 10 LSP frequencies corresponding to frame two of the output signal, the third group of the second set of ten LSP frequencies includes 10 LSP frequencies corresponding to frame three of the output speech signal, and the nth group 544 of the second set of ten LSP frequencies 503 includes 10 LSP frequencies corresponding to frame n of the output speech signal.

Next, a frame aligner module 504 aligns first group 530 of the first set of LSP frequencies with first group 540 of the second set of LSP frequencies. The first group, or frame, of the first set of LSP frequencies 530 includes 10 LSP frequencies $LSP_{11}(1)$, $LSP_{11}(2)$, $LSP_{11}(3)$ ... $LSP_{11}(10)$. Similarly, the first group, or frame, of the output signal includes 10 LSP frequencies, $LSP_{21}(1)$, $LSP_{21}(2)$, $LSP_{21}(3)$ ... $LSP_{21}(10)$.

A frame correlation calculator 506 then calculates a first-frame correlation error 507 using the 10 LSP frequencies from first group 530 of the first set of LSP frequencies and the 10 LSP frequencies from first group 540 of the second set of LSP frequencies as follows. First, the difference between $LSP_{21}(1)$ and $LSP_{11}(1)$ is calculated to form a difference value. The difference value is squared and multiplied by a weight factor to yield a first weighted LSP value. The weight factor selected corresponds to the LSP frequencies used to calculate the difference. The weight factors are preselected and represent the relative subjective importance of each of the 10 LSP frequencies to a listener. The weight factors may be selected using a variety of methods including performing experimental runs of weighted voice samples and noting a listener's audio perception of the voice sample.

For example, Table 1 shows a set of pre-selected weight factors corresponding to LSP frequencies 1–10, generated by experimentation, and which may be used to calculate a frame correlation error.

TABLE 1

| W(1) | 0.125 |
| W(2) | 0.156 |
| W(3) | 0.125 |
| W(4) | 0.125 |
| W(5) | 0.094 |
| W(6) | 0.094 |
| W(7) | 0.094 |
| W(8) | 0.063 |
| W(9) | 0.063 |
| W(10) | 0.063 |

Next, the difference between $LSP_{21}(2)$ and $LSP_{11}(2)$ is calculated. As before, the difference is squared and multiplied by the weight factor to yield a second weighted LSP value. Again, the weight factor is selected based on the LSP frequencies used to calculate the difference. The process of calculating the difference, squaring, and then multiplying by a weighting factor continues eight more times until the difference between $LSP_{21}(10)$ and $LSP_{11}(10)$ is calculated, squared, and multiplied by a weighting factor, thereby yielding 10 weighted LSP values denoted as a first weighted LSP value, a second weighted LSP value, ... a tenth weighted LSP value. Second, the 10 weighted LSP values are summed together, forming a sum LSP value. Next, the sum LSP value is divided by 10 to form a mean LSP value. Finally, the square root of the mean LSP value is taken, thereby yielding first-frame correlation error metric 507. Frame correlation metric 507, a weighted root-mean-square correlation error average, represents a spectral distortion measurement of the input signal as it travels through the digital channel.

The frame correlation error metric calculation may be represented as follows:

$$\sqrt{\frac{\sum_{i=10} W(i)[LSP_{out}(i) - LSP_{in}(i)]^2}{10}} = \text{Frame Correlation Error Metric}$$

wherein, $LSP_{out}(i)$ is a group of 10 LSP frequencies from the second set of LSP frequencies, each of the 10 LSP frequencies having a value denoted as (i) and $LSP_{in}(i)$ is a group of 10 LSP frequencies from the first set of LSP frequencies, each of the 10 LSP frequencies having a value denoted as (i), and W(i) is a weight factor value, each of the weight factor values pre-selected for each of the 10 LSP frequencies.

In order to achieve an accurate frame correlation error, the frames of the input speech signal should substantially align with their corresponding frames of the output speech signal. Because, however, any digital wireless communication channel such as digital channel test configuration 300 may drop frames and/or introduce time delay, spectral distortion may occur and the first frame of the input speech sample may not align with the first frame of the output speech signal. To accommodate the possibility of dropped frames and/or introduced delays, repeated calculations of frame correlation error metric 507 are calculated using the algorithm described above except the output signal is realigned with the input signal, frame by frame, such that first group of the second set of LSP frequencies 540 is aligned with second group of the first set of LSP frequencies 532, and so on. Thus, for calculation of a second-frame correlation metric, the first group of the second set of 10 LSP frequencies corresponding with frame one of the output signal second $\{LSP_{21}(1), LSP_{21}(2), LSP_{21}(3) \ldots LSP_{21}(10)\}$ is compared to the s first set of 10 LSP frequencies corresponding to frame two of the input signal $\{LSP_{12}(1), LSP_{12}(2), LSP_{12}(3) \ldots LSP_{12}(10)\}$ rather than first group of the first set of 10 LSP frequencies corresponding to frame one of the input signal. In other words, the first frame of the output speech signal is aligned with the second frame of the input speech signal and the second-frame correlation metric is calculated. The process of comparing the first frame of the output speech signal to each frame consecutive frames of the input speech signal continues until the midpoint frame of the speech input signal is reached, each comparison yielding a frame correlation error metric 507. The frame correlation metric from among first-frame correlation metric, second-frame correlation metric, third-frame correlation metric, . . . m/2-frame correlation metric, having the smallest value, is then selected by a frame correlation selector module 508. A resulting minimum frame correlation metric 511 corresponds the optimum alignment of frames between the speech input signal 319 and the output signal 329.

To determine whether the digital voice channel path is acceptable, minimum frame correlation metric 511 is compared to an expected threshold value in a threshold indicator 512. The expected threshold value is a preselected value based on the configuration of digital channel test configuration 300. If minimum frame correlation metric 511 is larger than the expected threshold value, output speech signal 329 contains an unacceptable amount of distortion, indicating that the digital voice channel path is not acceptable. However, if minimum frame correlation metric 511 is less than, or equal to the expected threshold value, output speech signal 329 contains an acceptable amount of distortion, indicating that the digital voice channel path is acceptable.

In another embodiment, each frame correlation error metric is compared to the previously calculated frame correlation error metric. Between the previous and current frame correlation error metric, the frame correlation metric having the smallest value is forwarded to threshold indicator 521. For example, the first-frame correlation metric is compared to the second-frame correlation metric, the second-frame correlation metric having a larger value than the first-frame correlation error metric. The second-frame correlation metric is then discarded, and the remaining first-frame correlation metric is compared to the next, or third-frame correlation error metric. Such an iterative approach to selecting the smallest value from two values precludes the need for gathering and storing the first-frame correlation metric, the second-frame correlation metric, the third-frame correlation metric, . . . m/2-frame correlation metric, prior to selecting the frame correlation metric having the smallest value.

Figure 6:
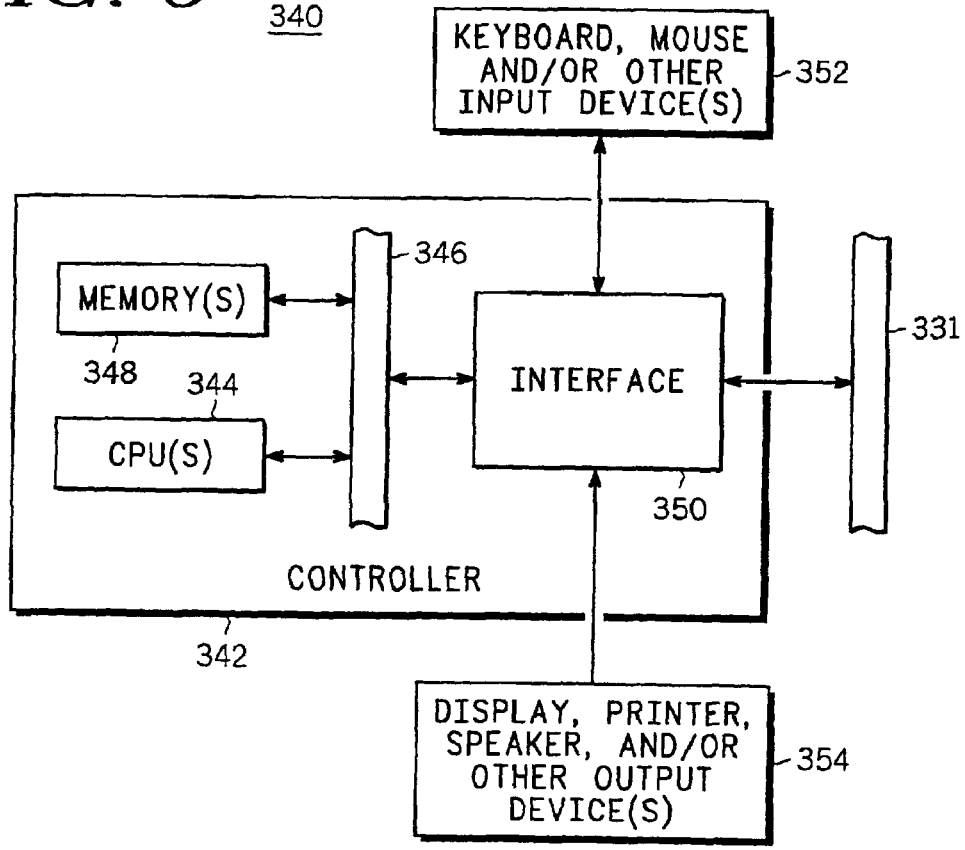
FIG. 6 is a more detailed block diagram showing another embodiment of a frame correlation error generator illustrated in FIG. 2.

A more detailed block diagram of another embodiment of frame correlation error generator 340 is illustrated in FIG. 6. Frame correlation error generator 340 may be a personal computer (PC), a personal digital assistant (PDA), an Internet appliance, a mobile station including either the source TSU or the destination TSU, or any other communication device. Frame correlation error generator 340 includes a controller 342 which preferably includes a central processing unit (CPU) 344 electrically coupled by address/data bus 346 to a memory device 348 and an interface circuit 350. CPU 344 may be any type of well known CPU, such as an Intel Pentium™ processor, or a Motorola PowerPC. Memory device 348 preferably includes volatile and non-volatile memory. Preferably, memory device 348 stores a software algorithm that interacts with digital channel test configuration 200 as described below. Memory device 348 may also store digital data indicative of inputs from digital channel test configuration 300, for example LSP frequencies and codes, as well as documents, files, programs, web pages, etc. retrieved from a server (not shown). In addition, memory device 348 may also store digital data loaded via an input device 352.

Interface circuit 350 may be implemented using any type of well known interface standard such as an Ethernet interface and/or a Universal Serial Bus (USB) interface. One or more input devices 352 may be connected to interface circuit 350 for entering data and commands by an operator into controller 342. For example, input device 352, preferably located at an operations and maintenance center for radio sub-system (OMC-R), may be a keyboard, mouse, touch screen, track pad, track ball, isopoint, and/or a voice recognition system.

One or more displays, printers, speakers, and/or other output devices 354 may also be connected to controller 342 via interface devices 350. Display 354 may be a cathode ray tube (CRTs), liquid crystal displays (LCDs), or any other type of display. Display 354 may generate visual displays of data generated during operation of frame correlation error generator 340, and/or may include prompts for human operator input, calculated values, detected data, etc.

Frame correlation error generator 340 may also exchange data with other devices via any type of network connection 331 to digital channel test configuration 200. Network connection 331 may be any type of network connection such as one or more twisted pairs of copper wire, an Ethernet connection, a digital subscriber line (DSL, a coaxial cable, a fiber optic cable, etc.

In addition to providing a comparison value to be compared with an expected threshold value, the minimum frame correlation error can provide a "fingerprint" of a faulty element or link of the digital channel test configuration 200. This is accomplished by comparing the correlation error to specific ranges. If the comparison falls within a specific range window, it implies that a specific subsystem of effect is responsible for an observed fault.

Figure 7:
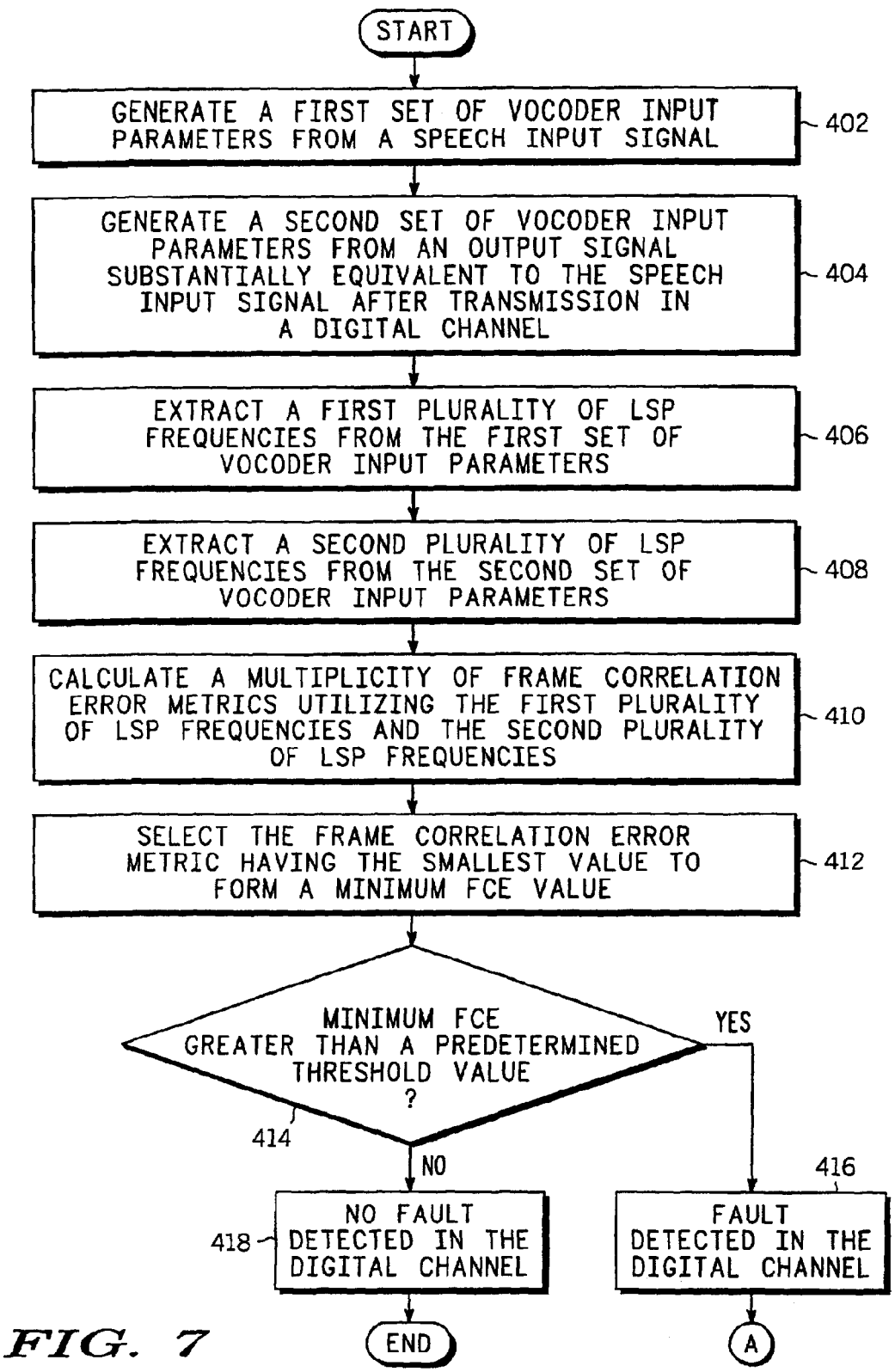
FIGS. 7 and 8, when joined along similarly lettered lines, together form a flowchart of a method for audio testing digital channels in a wireless communication system.

Referring to FIG. 7, a method 400 of audio testing digital channels in a wireless communication system begins at step 402 where a first set of vocoder input parameters is generated from a speech input signal 319. The speech input signal 319 results from vocoder encoding a speech signal received at a source mobile station, for example the source TMS 312 shown in FIG. 2 . At step 404, a second set of vocoder input parameters is generated from an output signal 329. The output signal 329 results from the speech input signal 319 being transmitted through the digital channel test configuration 200. Thus, the output signal 329 results from decoding and re-encoding the speech input signal 319 as it travels from the source TMS 312, through the source BTS 302, through the transcoder 306, through the MSC 308, through the transcoder 306, through the destination BTS 304, through the destination antenna 318, and to the destination TMS 314 shown in FIG. 2. Next, a first plurality of LSP frequencies 501 is extracted from the speech input signal 319 at step 406, and a second plurality of LSP frequencies 503 is extracted from the output signal 329 at step 408. The first plurality of LSP frequencies 501 includes a series of m groups of ten LSP frequencies. Likewise, the second plurality of LSP frequencies 503 includes a series of n groups of ten LSP frequencies. At step 410, a multiplicity of frame correlation error metrics is calculated using the first and second plurality of LSP frequencies.

Figure 9:
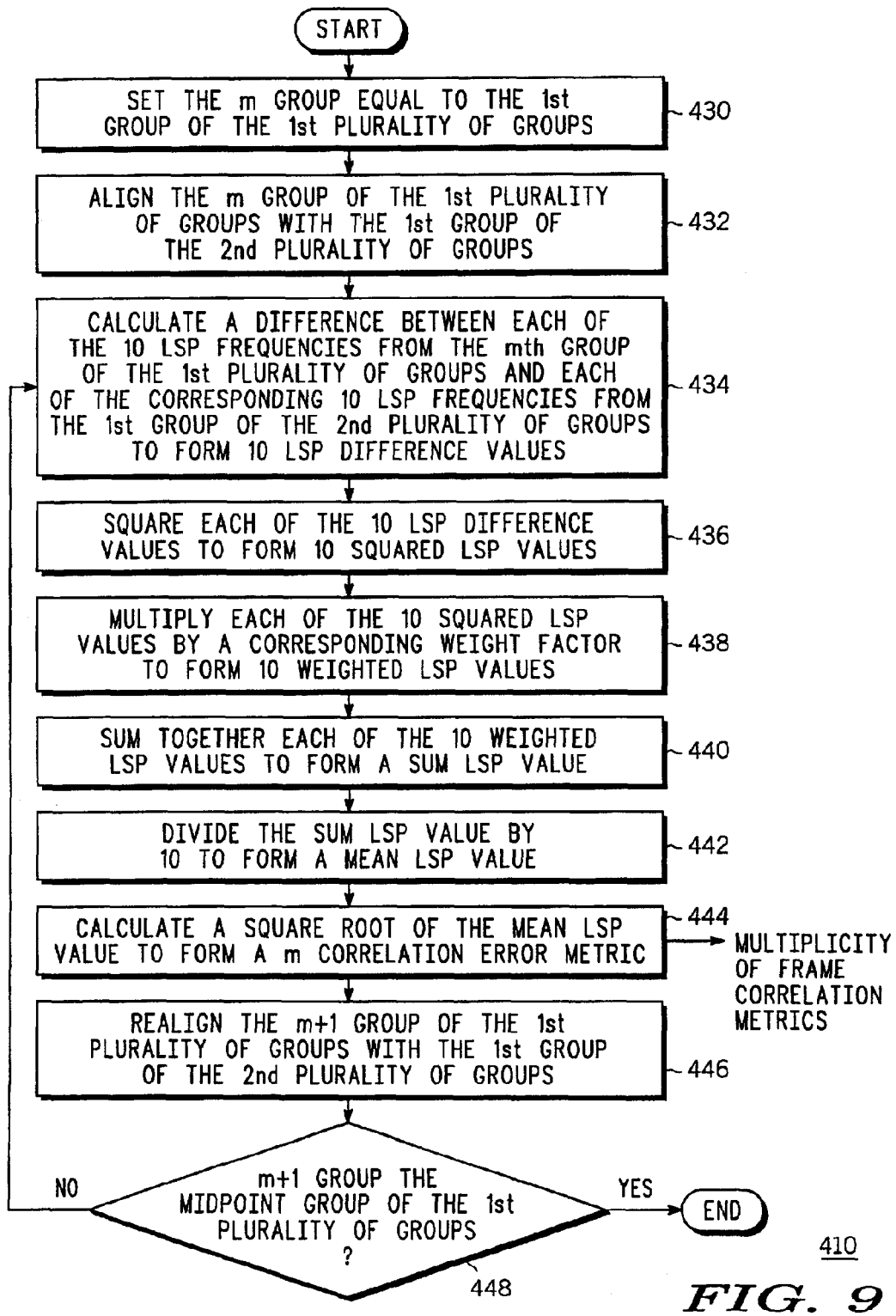
FIG. 9 is a more detailed flowchart of a method for calculating a multiplicity of frame correlation metrics used to detect a fault in the digital channel illustrated in FIG. 2.

A more detailed flowchart of the method for calculating the multiplicity of frame correlation metrics, step 410, is shown in FIG. 9. Calculating the multiplicity of frame correlation errors begins at step 430 where the m group is initialized to the 1st group of the first set of LSP frequencies 501. The m group of the 1st set of LSP frequencies 501 is then aligned with the 1st group of the second set of LSP frequencies 503 at step 432. At step 434, a difference is calculated between each of the 10 LSP frequencies from the m group of the 1st set of LSP frequencies 501 and each of the corresponding 10 LSP frequencies of the 1st group of the second set of LSP frequencies 503 to form 10 LSP difference values. Each of the 10 LSP difference values are squared at step 436, forming 10 squared LSP values. Each of the 10 squared LSP values is multiplied by a corresponding weight factor, step 438, forming 10 weighted LSP values. The 10 LSP weighted values are summed together at step 440, yielding a sum LSP value. The sum LSP value is divided by 10, step 442, yielding a mean LSP value. At step 444, the square root of the mean LSP value is calculated, forming one m correlation metric. The next group of the 1st set of LSP frequencies 501, or the m+1 group, is aligned with the 1st group of the second set of LSP frequencies 503 at step 446. The process of calculating another frame correlation error metric is repeated using steps 434–446, thereby yielding one frame correlation metric per alignment until the midpoint group of the 1st set of LSP frequencies 501 is reached at step 448. Accordingly, a multiplicity of frame correlation metrics is calculated.

Referring back to FIG. 7, at step 412, the frame correlation selector module selects the frame correlation error metric having the smallest value from the multiplicity of frame correlation error metrics, forming a minimum FCE. The minimum FCE is compared to a predetermined threshold value at step 414. If the minimum FCE is equal to, or less than a predetermined threshold value, no fault is detected in the digital channel 200 at step 418. If the minimum FCE is greater than the predetermined threshold value, however, a fault detection in the digital channel 200 is declared at step 416.

Figure 8:
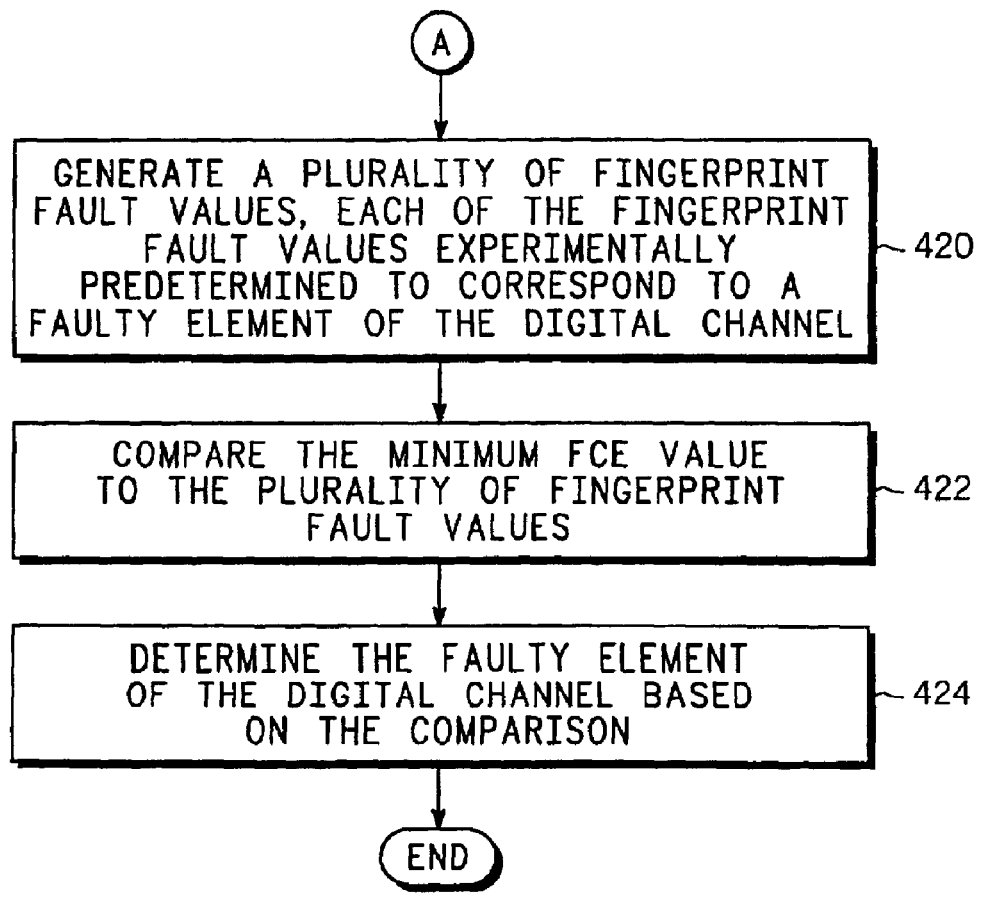

Referring to FIG. 8, a method for detecting a faulty element of the digital channel 200 begins at step 420 where a plurality of fingerprint fault values are generated for each faulty element of the digital channel 200. Preferably, each of the plurality fingerprint fault values was previously determined under controlled test conditions. At step 422, the minimum FCE value generated by the frame correlation error generator 340 is compared to the plurality of fingerprint fault values. The faulty element of the digital channel is then determined based on the comparison at step 424.

For example, one type of fault may result from (1) the selection of a dead channel element in the source BTS 302, causing a "silent" output signal at the destination TMS 314. The fingerprint fault value expected for a fault of this type may be equivalent to a minimum FCE value up to about 50% higher than the predetermined threshold value because the output signal would be about 100% silence rather than the output signal 329 expected to be composed of about 50% silence and 50% sound. Another type of fault may result from (2) the selection of a noisy terrestrial circuit by the MSC 160 causing additional noise in the output signal. The fingerprint fault value expected for a fault of this type may be equivalent to a slightly higher minimum FCE value than (1) and therefore may be equivalent to a minimum FCE value approximately 50% higher or above than the predetermined threshold value a minimum FCE value because the noise would be spread through out the output signal. Yet another type fault may result from (3) the selection of a weak radio channel between the source BTS 302 and the source antenna 316 causing a large number of dropped frames in the output signal. The fingerprint fault value expected for a fault of this type may be equivalent to a minimum FCE value greater than predetermined threshold value but less then the fingerprint fault value for (1). Thus, the experimentally predetermined fingerprint fault values can be compared to the minimum FCE value generated by the frame correlation generator 340 to determine the faulty element within the digital channel 200.

What is claimed:

1. In digital wireless communication system, the digital wireless communication system including a plurality of elements comprising a plurality of mobile stations, a plurality of base transceiver stations, each of the plurality of base transceiver stations in communication with at least one of the plurality of mobile stations, a transcoder configured to provide a signal conversion capability between vocoder frames and pulse code modulation, and a mobile switching center for interconnecting the digital wireless communication system to a public switched telephone network, a method for determining a fault in a digital channel of the digital wireless communication system, the method comprising:

(a) generating a first set of vocoder input parameters, the first set of vocoder input parameters resulting from a speech input signal;

(b) generating a second set of vocoder input parameters, the second set of vocoder input parameters resulting from an output signal substantially equivalent to the speech input signal as it is received at a mobile station via the digital channel;

(c) calculating a metric based on the first set of vocoder input parameters and the second set of vocoder input parameters; and (d) determining a fault in the digital channel using the metric.

2. The method for determining a fault in a digital channel according to claim 1, wherein the step of generating the first set of vocoder input parameters comprises vocoder encoding a speech signal to form the speech input signal.

3. The method for determining a fault in a digital channel according to claim 2, wherein the step of generating the first set of vocoder input parameters further comprises simulating the speech signal by generating m frames of a vowel sound followed by m frames of silence followed by m frames of the vowel sound followed by m frames of silence.

4. The method for determining a fault in a digital channel according to claim 1, wherein the step of transmitting the speech input signal to a mobile station further comprises:

vocoder decoding the speech input signal to form a pulse code modulation signal;

transmitting the pulse code modulation signal through the mobile switching center to form a switched pulse code modulation signal;

vocoder encoding the switched pulse code modulation signal to form a vocoder re-encoded speech input signal, the vocoder re-encoded speech input signal substantially equivalent to the speech input signal having been vocoder decoded and re-encoded; and transmitting the vocoder re-encoded speech input signal to the mobile station.

5. The method for determining a fault in a digital channel according to claim 1, wherein the step of calculating the metric comprises:

extracting a first plurality of groups of line spectrum pair (LSP) frequencies from the first set of vocoder input parameters, the first plurality of groups comprising groups of ten LSP frequencies per group;

extracting a second plurality of groups of LSP frequencies from the second set of vocoder input parameters, the second plurality of groups comprising groups of ten LSP frequencies per group;

calculating a multiplicity of frame correlation error (FCE) metrics utilizing the first plurality of groups of LSP frequencies and the second plurality of groups of LSP frequencies;

selecting the FCE metric having the smallest value from among the multiplicity of FCE metrics to form a minimum FCE value, the minimum FCE value indicating optimum alignment of the speech input signal with the output signal; and comparing the minimum FCE value to a threshold value, the minimum FCE value indicating a fault in the digital channel if the minimum FCE value is greater than the threshold value.

6. The method for determining a fault in a digital channel according to claim 5, further comprising:

generating a plurality of fingerprint fault values, wherein the plurality fingerprint fault values are experimentally predetermined, and wherein each of the fingerprint fault values corresponds to a faulty element of the digital channel;

comparing the minimum FCE value to the plurality of fingerprint fault values; and determining the faulty element of the digital channel based on the comparison.

7. The method for determining a fault in a digital channel according to claim 6, wherein the element is a noisy terrestrial circuit selected by the mobile switching center, and wherein the fingerprint fault value is substantially equivalent to a minimum FCE value greater than or equal to a value about 50 percent higher than the threshold value.

8. The method for determining a fault in a digital channel according to claim 6, wherein the element is a dead channel element of a base transceiver station of the digital channel, and wherein the fingerprint fault value is substantially equivalent to a minimum FCE value up to about a value of 50 percent higher than the threshold value.

9. The method for method for determining a fault in a digital channel according to claim 5, wherein the step of calculating the multiplicity of frame correlation error metrics comprises:

(a) aligning the first group of the first plurality of groups with the first group of the second plurality of groups;

(b) calculating a difference between each of the ten LSP frequencies from the first group of the first plurality of groups and each of the corresponding ten LSP frequencies from the first group of the second plurality of groups to form ten LSP difference values;

(c) squaring each of the ten LSP difference values to form ten squared LSP values;

(d) multiplying each of the ten LSP values by a corresponding weight factor value to form ten weighted LSP values;

(e) summing together each of the ten weighted LSP values to form a sum LSP value;

(f) dividing the sum LSP value by ten to form a mean LSP value;

(g) calculating a square root of the mean LSP value to form a frame correlation error metric of the multiplicity of frame correlation error metrics;

(h) realigning the next group of the first plurality of groups with the first group of the second plurality of groups; and (i) repeating steps (a) through (h) until the first group of the second plurality of groups is aligned with a midpoint group of the first plurality of groups, the midpoint group marking the midpoint of the first plurality of groups.

10. The method for determining a fault in a digital channel according to claim 9, wherein the weight factor values are preselected based on a ranking of importance to a listener and correspond to the LSP frequencies used to calculate the difference.

11. The method for method for determining a fault in a digital channel according to claim 5, wherein the step of calculating each of the plurality of frame correlation error metrics comprises calculating:

$$\sqrt{\frac{\sum_{i=10} W(i)[LSP_{out}(i) - LSP_{in}(i)]^2}{10}} = \text{Frame Correlation Error Metric}$$

wherein, i is the value 10, $LSP_{out}(i)$ is a group of 10 LSP frequencies from the second plurality of LSP frequencies, each of the 10 LSP frequencies having a value denoted as (i), and $LSP_{in}(i)$ is a group of 10 LSP frequencies from the first plurality of LSP frequencies, each of the 10 LSP frequencies having a value denoted as (i), and W(i) is a weight factor value, each of the weight factor values pre-selected for each of the 10 LSP frequencies.

12. The method for determining a fault in a digital channel according to claim 11, wherein the weight factor values are preselected based on a ranking of importance to a listener and correspond to the LSP frequencies used to calculate the difference.

13. The apparatus for determining a fault in a digital channel according to claim 12, wherein the speech signal is m frames of a vowel sound followed by m frames of silence followed by m frames of the vowel sound followed by m frames of silence.

14. The apparatus for determining a fault in a digital channel according to claim 12, wherein the transcoder is further configured to vocoder decode the speech input signal to form a pulse code modulation signal;

transmit the pulse code modulation signal to the mobile switching center to form a switched pulse code modulation signal;

receive the switched pulse code modulation signal from the mobile switching center;

vocoder encode the switched pulse code modulation signal to form a vocoder re-encoded speech input signal, the vocoder re-encoded speech input signal substantially equivalent to the speech input signal having been vocoder decoded and re-encoded; and transmit the vocoder re-encoded speech input signal to the mobile station.

15. The apparatus for determining a fault in a digital channel according to claim 14, wherein the frame correlation calculator is further configured to calculate each of the multiplicity of frame FCE metrics utilizing an equation:

$$\sqrt{\frac{\sum_{i=10} W(i)[LSP_{out}(i) - LSP_{in}(i)]^2}{10}} = \text{Frame Correlation Error Metric}$$

wherein, i is the value 10, $LSP_{out}(i)$ is a group of 10 LSP frequencies from the second plurality of LSP frequencies, each of the 10 LSP frequencies having a value denoted as (i), and $LSP_{in}(i)$ is a group of 10 LSP frequencies from the first plurality of LSP frequencies, each of the 10 LSP frequencies having a value denoted as (i), and W(i) is a weight factor value, each of the weight factor values pre-selected for each of the 10 LSP frequencies.

16. The apparatus for determining a fault in a digital channel according to claim 12, wherein the frame correlation error generator further comprises:

a line spectrum pair (LSP) frequency extractor module configured to extract a first plurality of groups of LSP frequencies from the first set of vocoder input parameters and a second plurality of groups of LSP frequencies from the second set of vocoder input parameters, the first plurality of groups comprising groups of ten LSP frequencies per group and the second plurality of groups comprising groups of ten LSP frequencies per group;

a frame aligner module configured to align the first group of the first plurality of groups of LSP frequencies with the first group of the second plurality of groups of LSP frequencies;

a frame correlation calculator configured to calculate a multiplicity of frame correlation error (FCE) metrics utilizing the first plurality of groups of LSP frequencies and the second plurality of groups of LSP frequencies;

a frame correlation selector module configured to select the FCE metric having the smallest value from among the multiplicity of FCE metrics to form a minimum FCE value, the minimum FCE value indicating optimum alignment of the speech input signal with the output signal; and a threshold indicator configured to compare the minimum FCE value to a threshold value, the minimum FCE value indicating a fault in the digital channel if the minimum FCE value is greater than the threshold value.

17. An apparatus for determining a fault in a digital channel of a digital wireless communication system, the apparatus comprising:

(a) a source test mobile station configured to generate a first set of vocoder input parameters, the first set of vocoder input parameters resulting from vocoder encoding a speech signal received by the source test mobile station to form a speech input signal;

(b) a transcoder configured to generate a second set of vocoder input parameters, the second set of vocoder input parameters resulting from an output signal substantially equivalent to the speech input signal as it is received at a destination test mobile station via the digital channel; and (c) a frame correlation error generator configured to calculate a metric based on the first set of vocoder input parameters and the second set of vocoder input parameters, and determine a fault in the digital channel using the metric.

* * * * *